United States Patent [19]

Steininger et al.

[11] Patent Number: 4,848,744
[45] Date of Patent: Jul. 18, 1989

[54] AUTOMATED VIDEO SYSTEM WITH ALIGNMENT OF THE VIDEO TUBE

[76] Inventors: Eduard Steininger, In der Au 1, 6251 Zollhaus; Udo Steininger, Brandenburger Str. 57, Diez a.d. Lahn, both of Fed. Rep. of Germany

[21] Appl. No.: 5,709

[22] Filed: Jan. 21, 1987

[30] Foreign Application Priority Data

Jan. 22, 1986 [DE] Fed. Rep. of Germany ....... 3601813

[51] Int. Cl.⁴ .............................................. A63F 9/00
[52] U.S. Cl. ............................ 273/1 E; 273/DIG. 28
[58] Field of Search ................ 273/1 E, 1 GC, 1 GE, 273/85 G, DIG. 28; 248/181, 663, 138 A; 434/43

[56] References Cited

U.S. PATENT DOCUMENTS 4,352,492 10/1982 Smith .......................... 273/DIG. 28
4,478,407 10/1984 Manabe ................................. 434/43
4,500,060 2/1985 Anderson et al. ................... 248/663

FOREIGN PATENT DOCUMENTS 3309368 3/1983 Fed. Rep. of Germany .
3301880 9/1984 Fed. Rep. of Germany .
8427491 2/1985 Fed. Rep. of Germany .
3347156 7/1985 Fed. Rep. of Germany .

OTHER PUBLICATIONS

Translation of German Pat. #G8427491.2 to Botta Automaten, 1/17/85.

Primary Examiner—Maryann Lastova
Attorney, Agent, or Firm—Robert J. Koch

[57] ABSTRACT

An automatic video game apparatus, where a control panel, at least one speaker and at least one video tube are located in a housing, together with an electronic and an electric circuit layout and optionally an automatic coin slot device. The video tube of the automatic video apparatus is supported pivotingly in its image plane by an actuable motor and may be pivoted with the aid of the motor corresponding to the variable position of a program selection switch and the program (game) selection effected by it, into the position determined by this program. The video tube is equipped with an annular, rotatable frame supported on rolls, which is pivoted by a pressure roll acting on the outer edge of the frame of the actuable drive motor. All of the video control functions of a program (game) recorded on a program disk and selected by a program selection switch and the energizing effected by it of an associated group of switches, may be communicated to the image tube. Each group of switches act upon an associated motor position switch connected with the motor, which in turn actuates the motor.

8 Claims, 3 Drawing Sheets

AUTOMATED VIDEO SYSTEM WITH ALIGNMENT OF THE VIDEO TUBE

BACKGROUND OF THE INVENTION

1. Field of the Invention

The invention concerns an automatic video apparatus, in particular a video game apparatus, including a control panel, at least one speaker and at least one video tube, together with an electronic and electric circuit layout and optionally an automatic coin device, located in a housing.

2. Description of the Related Technology

In the course of the continuing development of video screen devices and in particular of microprocessor technology, complex programs were developed among others for example for entertainment purposes, which display certain sequences as a simulation of possible events. Such devices are used as simulators, for example in driving schools, pilot training and the like.

Game programs for entertainment purposes are also becoming more elaborate, as the expectations of users continuously increase. There is not only a need for more extensive games, but users also desire a multitude of different programs, thereby increasing their entertainment value.

To satisfy these needs, automatic video game machines have been developed which are loaded with different programs which users may choose among.

The Braun tube as developed originally and which is the basis of monitors, has a round screen configuration, but in particular for the purposes of television technology, video tubes were produced with oval or nearly rectangular configurations and different edge lengths, with the screen being used in a broadside format. The overwhelming number of all events take place in a plane or may be represented in a plane, so that the broadside format is most appropriate for the purpose.

Video screens with an upright format were developed for special applications, for example for personal computers, they are used mainly for word processing programs. In this manner a DIN A4 (standard) page may be conveniently reproduced on the screen.

Particularly among game programs there are those that must be presented in an upright format, for example space games, while another group of games is more suitable for reproduction in broadside formats. Heretofore this problem was solved by using different devices for each group of games. However, the machines themselves are becoming more elaborate and thus more expensive and if, for example, a restaurant wishes to offer a great variety of games, it is necessary to install two machines. This additionally leads to a space problem.

SUMMARY OF THE INVENTION

It is therefore the object of the invention to eliminate this disadvantage and to provide an apparatus capable of reproducing video programs both in the broadside and the upright formats, without the need for manipulations of any kind by the player.

This object is attained by that in the aforementioned automatic video apparatus the video tube is supported in a manner such that it is pivotable in its image plane by an actuable motor and that said video tube may be brought by means of said motor in keeping with the variable position of a program selection switch and the program (game) selected thereby, into the position corresponding to said program.

According to the invention, the selection of a program automatically actuates the setting of a position of the screen format required by the program chosen. The operator has no effect on this positioning, aside from the selection of the program.

In a further development of the program, the video tube may be pivoted by means of an annular, rotatable frame supported on rollers, upon the outer edge of which a pressure roll of the actuable drive motor is acting.

The angle of the pivoting movement of the annular frame is 90°, so that repositioning from the upright into the broadside position and vice versa, is possible.

In a still further development of the invention, the outer edge of the frame comprises stops for the terminal positioning of its pivoting movement, said stops being placed in a manner such that they are acting on the drive motor. In this fashion, the motor is automatically deactivated upon reaching its terminal position.

According to the invention, all video control functions may be communicated to the video tube by means of a program (game) recorded on a program disk and selected by the actuation of a program selection switch, and the subsequent actuation of an appropriately correlated group of switches. Each of the groups of switches acts in an advantageous manner on a motor positioning switch coordinated with it and connected with the motor, with said positioning switch then actuating the motor.

According to the invention, each program disk is associated with a group of switches actuable by means of the program selection switch.

In an advantageous manner, several groups of switches are correlated with a motor positioning switch and each of said motor positioning switches acts after being activated on the motor so that the video tube occupies the position associated with the motor positioning switch.

The invention will become more apparent from the drawing attached hereto.

DETAILED DESCRIPTION OF THE PREFERRED EMBODIMENT

Figure 2:
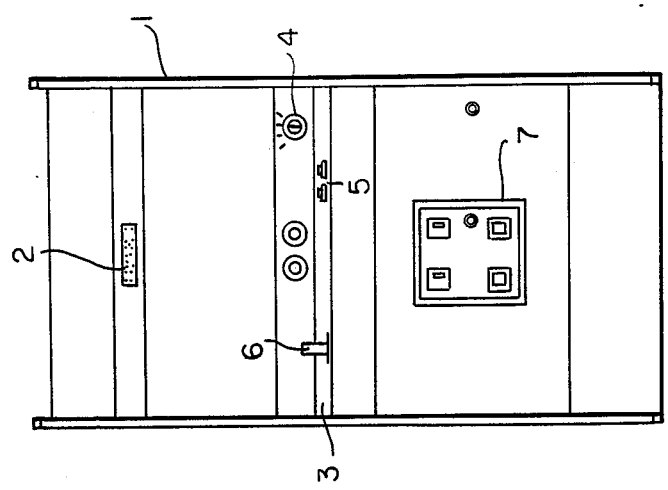
FIG. 2 shows a front elevation of an automatic video game apparatus.
Figure 1:
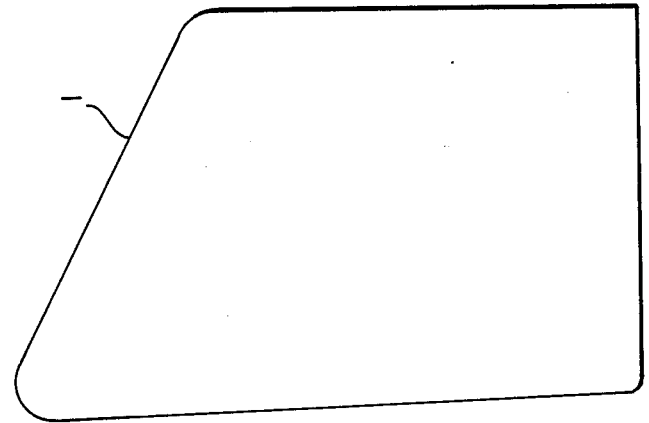
FIG. 1 shows a lateral elevation of an automatic video game apparatus.

FIG. 1 shows the external housing configuration of the automatic video game apparatus 1 and FIG. 2 the corresponding front elevation. In the upper part of the automatic video game apparatus a speaker 2 is located and in the center part the control panel 3 with a program selection switch 4, two game knobs 5 and a game lever 6. The lower part of the housing contains an automatic coins slot device.

Figure 4:
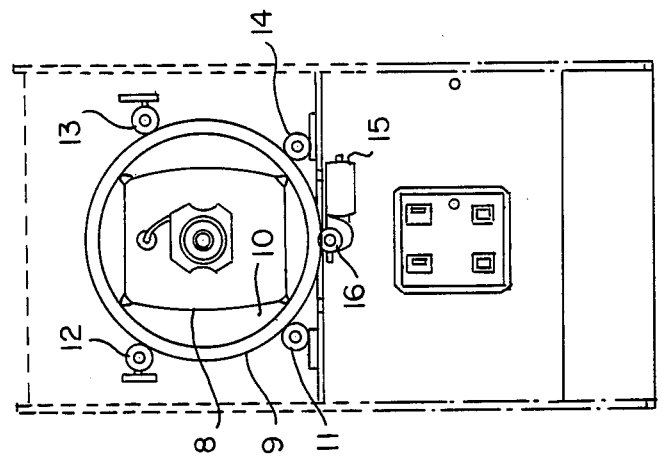
FIG. 4 shows a front elevation of an automatic video game apparatus in section.
Figure 3:
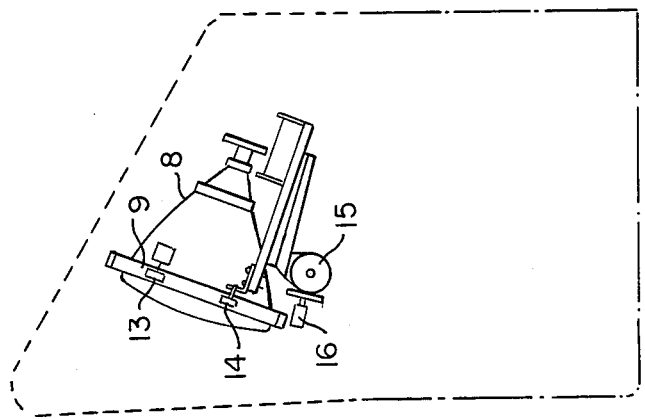
FIG. 3 shows a lateral elevation of an automatic video game apparatus in section.

FIGS. 3 and 4 correspond to FIGS. 1 and 2, but they show the layout and configuration of the monitor or video screen 8 in section. The latter is mounted by means of an annular frame 9 and between the frame 9 and the video screen 8 a wood panelling 10 is inserted. The annular frame 9 is supported rotatingly on rollers 11, 12, 13 and 14 and a motor 15, in the form of a drive motor, is provided with a rubber pressure roll 16 for the transfer of the rotating forces.

If a voltage is applied to the motor 15, as explained below in connection with FIG. 5 in more detail, the rubber pressure roll transfer its rotating force to the annular frame 9 and the video screen 8 executes a pivoting motion by an angle of 90°, so that it changes its position from an upright to a broadside format or vice versa.

Figure 5:
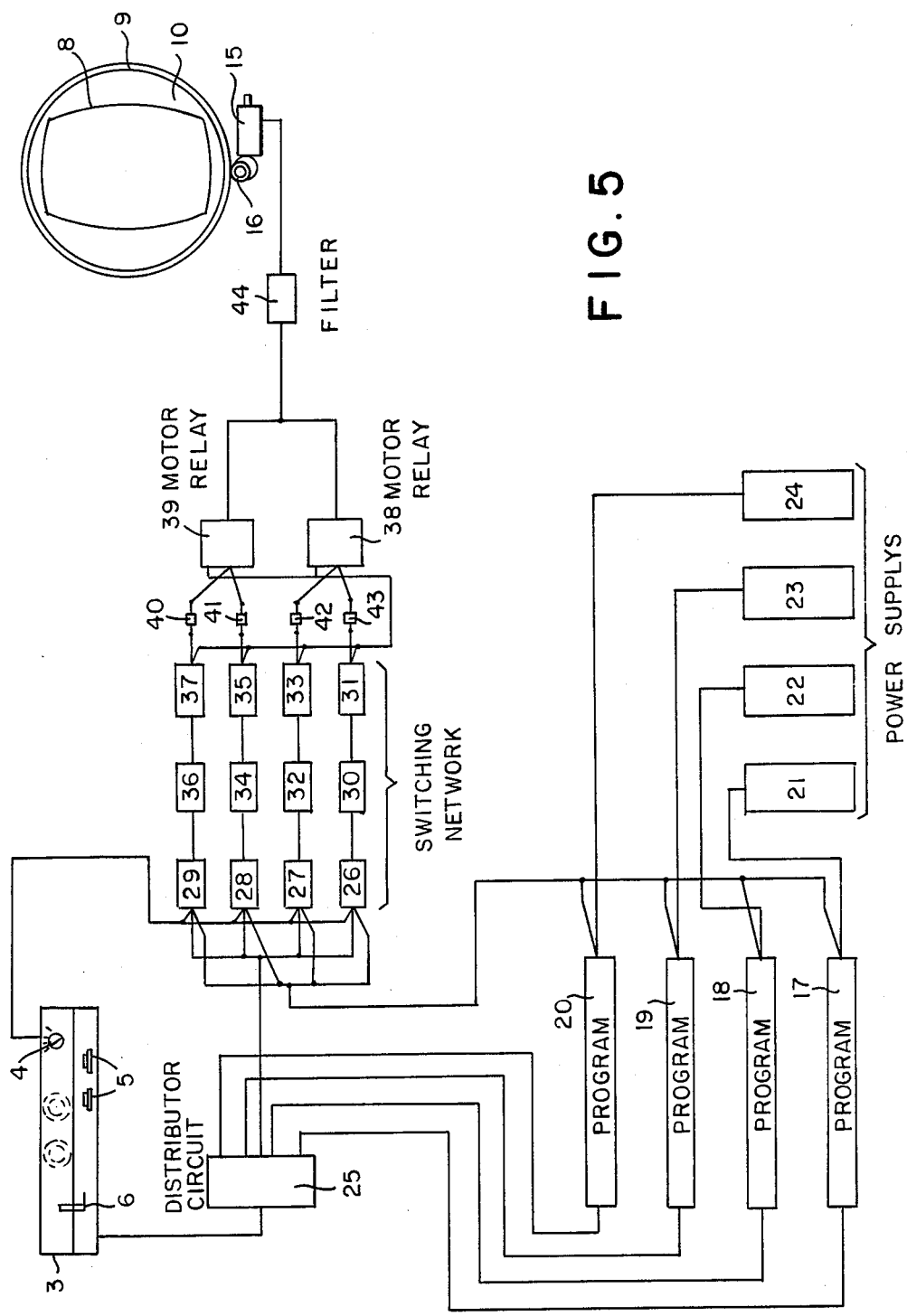
FIG. 5 shows a circuit layout of an automatic video game apparatus in a schematic diagram.

FIG. 5 shows the electric circuit of the automatic video game apparatus 1 for the automatic execution of a pivoting motion of the video screen 8 in its image plane by an angle of 90° by means of the motor 15 and its drive roll 16. For the sake of simplicity, the circuit shown is described with relays. Suitable semiconductor circuit elements and microprocessors may also be used.

In the example described herein four program disks 17, 18, 19, and 20 are used, which in a known manner are in the form of plug-in disks. A greater number of program disks may also be used. Each of the disks contained its own game program and for each game program the appropriate position of the video screen 8, i.e. an upright or a broadside format is given. Each program disk is equipped with its own power supply 21, 22, 23 and 24. From the program disks 17, 18, 19 and 20 electric conduits lead to a distributor circuit 25, which combines similar functional lines.

Each program disk 17, 18, 19 and 20 is further associated with a row of switches 26, 27, 28 and 29, which are electrically connected with the distributor circuit 25 and the program selection switch 4. The row of switches 26 comprises the switches or relays 30 and 31; the row of switches 27 the switches 32 and 33; the row of switches 28 the switches or relays 34 and 35 and the row of switches 29 the switches or relays 36 and 37. Each row of switches is secured by a diode 40, 41, 42, 43 respectively, against reverse currents. The rows of switches are followed by the motor relays 38 and 39. Each relay 38 or 39 is associated with a position of the video screen 8, i.e. if for example the relay 38 is energized, it actuates the motor 15 and the latter occupies its predetermined position. The same is true for the relay 39. Between the relays 38 and 39 and the motor 15 a conventional interference filter 44 is located.

Each group of switches 26, 27, 28 and 29 is associated in keeping with the particular program with a motor relay 38 or 39.

The operator sets the game desired by means of the program selection switch 4. The corresponding program disk, for example the program disk 17, is thereby actuated and the associated row of switches 26 energized, together with the relays 30 and 31. The motor relays 38 now connects through and the motor 15 occupies the position associated with said motor relay 38. The relays 26, 30 and 31 further insures that all video functions and video signal channels of the program disk selected are connected with the monitor or video screen separately from the video functions or signal channels of the other program disks. This includes for example four channels for the four geometric directions of the cursor, which are controlled by the game lever 6, three color channels, a synchronizing signal channel and two or four audio signal channels. If the program selection switch is switched to another program, a similar process is effected.

We claim:

1. A video apparatus comprising a pivot mounted video tube;
    means for controlling image plane rotational alignment of said video tube including a game selection switch and a switching network connected to said game selection switch;
    means for pivoting said video tube responsive to said means for controlling;
    a plurality of program modules each connected to said game selection switch and said switching network, wherein said means for controlling further comprises a means for setting predetermined rotational alignment of said video tube corresponding to a selected program module directly responsive to said game selection switch; and
    a motor position control switch responsive to said switching network and connected to said means for pivoting.

2. An apparatus according to a claim 1, further comprising:
    a rotating frame bearing said video tube; and
    said means for pivoting comprises a plurality of rollers supporting said video tube in said frame, and a drive motor exhibiting a pressure roll disposed against said rotating frame.

3. An apparatus according to claim 2, wherein said means for controlling further comprises stop means disposed on said frame for limiting rotation of said video tube.

4. An apparatus according to claim 2, further comprising an interference filter disposed between said drive motor and said means for controlling.

5. An apparatus according to claim 1, wherein said switching network comprises a plurality of switching groups, each group corresponding to an associated program module.

6. An apparatus according to claim 5 wherein said motor position control switch exhibits a first and a second tube alignment stage; and
    wherein said first stage is responsive to at least one switching group and said second stage is responsive to at least one other switching group, wherein no switching group actuates more than a single tube alignment stage.

7. An apparatus according to claim 6 wherein said first tube alignment stage is responsive to a plurality of switching groups.

8. An apparatus according to claim 1, further comprising:
    housing means for supporting said video tube;
    game processing circuitry connected to said video tube arranged within said housing means;
    a speaker, a control panel and an automatic coin slot device associated with said game processing circuitry and mounted on said housing.

* * * * *